United States Patent [19]

Kawabuchi et al.

[11] Patent Number: 5,945,463
[45] Date of Patent: Aug. 31, 1999

[54] COMPOSITION FOR A GASKET AND PROCESS FOR PRODUCING A GASKET USING THE COMPOSITION

[75] Inventors: Ichiro Kawabuchi, Yokohama; Tetsuro Yamada, Kawasaki; Yoshio Kenmochi, Ichihara; Atsuo Ishikawa, Tokyo, all of Japan

[73] Assignees: Zeon Rize Co., Ltd.; Sunarrow Limited, both of Tokyo, Japan

[21] Appl. No.: 08/809,368

[22] PCT Filed: Sep. 29, 1995

[86] PCT No.: PCT/JP95/01981

§ 371 Date: Mar. 28, 1997

§ 102(e) Date: Mar. 28, 1997

[87] PCT Pub. No.: WO96/10594

PCT Pub. Date: Apr. 11, 1996

[30] Foreign Application Priority Data

Sep. 30, 1994 [JP] Japan .................................. 6-261065
Mar. 13, 1995 [JP] Japan .................................. 7-80711

[51] Int. Cl.[6] .............................. C08F 2/48; C08F 2/50; C08L 75/16
[52] U.S. Cl. .............................. 522/96; 522/97; 522/100; 522/103; 277/650
[58] Field of Search ........................ 522/96, 97, 100–103; 277/650

[56] References Cited

U.S. PATENT DOCUMENTS 3,425,988  2/1969  Gorman et al. ........................ 260/47
4,355,053  10/1982  Nezu et al. ........................ 522/103
5,213,947  5/1993  Ueda et al. ........................ 522/96
5,326,611  7/1994  Kishita et al. ........................ 528/31
5,496,870  3/1996  Chawla et al. ........................ 522/96

FOREIGN PATENT DOCUMENTS 58-7419  1/1983  Japan.

*Primary Examiner*—Susan W. Berman
*Attorney, Agent, or Firm*—Armstrong, Westerman, Hattori, McLeland & Naughton

[57] ABSTRACT

A composition for a gasket which comprises (A) 100 parts by weight of a urethane acrylate oligomer having a weight-average molecular weight of 7,000 to 40,000, (B) 40 to 260 parts by weight of a polyether monoacrylate substituted at the end and/or a polyether polyester monoacrylate substituted at the end, and (C) 0.5 to 5 parts by weight of a photopolymerization initiator and has a viscosity of 4,000 to 100,000 centipoises at 25° C.; and a process for producing a gasket by discharging the above composition on a substrate by using an X-Y-Z-driving automatic coating robot and curing the discharged composition by irradiation of ultraviolet light.

A gasket can be formed to an accurate shape. Operations of forming and attaching the gasket can easily be conducted, and loss of the used material can be reduced. The gasket has a large tearing strength and a small compression set and is excellent in the flexibility and the sealing property. Contamination of the inside of containers of high precision instruments with volatile matters generated from the gasket can be prevented.

14 Claims, 1 Drawing Sheet

COMPOSITION FOR A GASKET AND PROCESS FOR PRODUCING A GASKET USING THE COMPOSITION

TECHNICAL FIELD

The present invention relates to a composition for a gasket used for sealing containers which encase high precision instruments, such as magnetic hard disk driving units (HDD) used as memories of electronic computers and the like instruments, portable telephones, and electronic note books, and a process for producing the composition.

BACKGROUND ART

A magnetic hard disk driving unit of electronic computers and the like instruments writes and reads information through a magnetic head while a hard magnetic disk encased in a sealed container is rotated. The distance between the magnetic head and the magnetic disk is very small, and there is the possibility that the magnetic head and magnetic disk are broken to cause loss of valuable data when dust invade into the sealed container. In order to prevent such an accident, it is generally conducted that a gasket prepared by forming a macromolecular elastomer into a ring shape is placed between the main part of the container and a dust cover. As such a macromolecular elastomer, a cellular polyurethane or a cellular chloroprene rubber has heretofore been used. A gasket having a ring shape is punched out from a sheet of the above macromolecular elastomer, and the obtained gasket is attached to the container to be sealed by a mechanical method, such as fixing with screws, or by adhesion. However, these operations cause problems that the operations take considerable labor and moreover that silicone oils contained in the macromolecular elastomer as the foam stabilizer and the adhesive are vaporized and contaminate the inside of the instrument to cause error in the function of the instrument.

Using a product prepared by molding chloroprene rubber or butyl rubber together with a metal substrate as the gasket of a magnetic hard disk has been proposed. However, it is necessary for producing such a gasket that the gasket be formed by using a mold and the formed burr be removed. The operation of removing the burr causes problems that the operation takes labor and that dust is formed from the gasket when removal of the burr is insufficient, possibly causing a broken magnetic hard disk. It has also been proposed that a gasket for a magnetic hard disk is formed by coating specified parts of a dust cover with a liquid silicone rubber material and then curing the silicone rubber material (Japanese Patent Application Laid-Open No. Heisei 4(1992)-106776). However, this process causes the possibility that uncured low molecular weight siloxanes are vaporized from the silicone rubber material and condensed on the surfaces of the magnetic head and the magnetic disk.

In order to improve the above drawbacks, a gasket made of a flexible microcell polyurethane which is obtained from a polyol, an isocyanate, a foaming agent, and a silicone foam stabilizer of the reactive type and has an average cell diameter of 150 μm or less has been proposed in Japanese Patent Application Laid-Open No. Heisei 5(1993)-234351. However, the problem of contamination with the residual foaming agent and foam stabilizer still remains unsolved.

For the reasons described above, development of a gasket which is easily formed and attached to a substrate, reduces loss in the used material, and does not cause contamination of a magnetic hard disk drive with dust and volatile matters is desired. Development of a gasket which can achieve complete sealing of printed circuits from dust and volatile matters in portable telephones and electronic note books is also desired by the same reasons.

Accordingly, the present invention has an object of providing a composition for a gasket which can be formed to an accurate shape, enables easy operations of forming and attaching the gasket without requiring much labor and reduction in loss of the used material, provides a gasket having a large tearing strength and a small compression set and excellent in the flexibility and the sealing property, and can prevent contamination of the inside of containers of high precision instruments with volatile matters generated from the gasket, and another object of providing a process for producing the gasket by using the above composition.

DISCLOSURE OF THE INVENTION

As the result of extensive studies by the present inventors to solve the above problems, it was discovered that a composition comprising a specific urethane oligomer and a specific monoacrylate has a good curing property by irradiation of ultraviolet light, that the cured product has excellent mechanical properties and is chemically stable so that volatile matters are not emitted, and that a gasket can be produced conveniently and quickly from the composition by using an automatic coating robot. The present invention has been completed on the basis of the discoveries.

Accordingly, the present invention provides:

(1) A composition for a gasket which comprises (A) 100 parts by weight of a urethane acrylate oligomer having a weight-average molecular weight of 7,000 to 40,000, (B) 40 to 260 parts by weight of one type of monoacrylate or a mixture of two or more types of monoacrylate selected from the group consisting of monoacrylates represented by the following general formula [1] or [2], and (C) 0.5 to 5 parts by weight of a photopolymerization initiator, has a viscosity of 4,000 to 100,000 centipoises at 25° C., and can be cured by an active energy radiation:

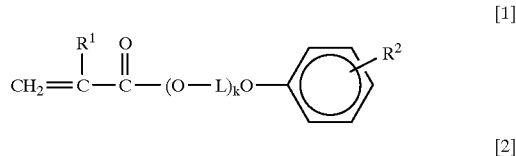

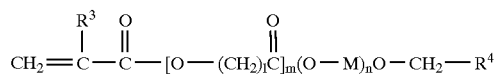

(wherein $R^1$ and $R^3$ represent each hydrogen or methyl group, $R^2$ represents hydrogen or a hydrocarbon group having 1 to 15 carbon atoms, $R^4$ represents

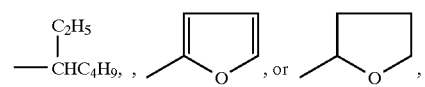

L and M represent each ethylene group or 2-hydroxy-1, 3-propylene group, k represents an integer of 1 to 20, l represents an integer of 3 to 5, m and n represent each 0 or an integer of 1 to 6, and m and n do not represent 0 simultaneously);

(2) A composition for a gasket described in (1) wherein the active energy radiation is ultraviolet light;

(3) A composition for a gasket described in any of (1) and (2) wherein the urethane acrylate oligomer has a weight-average molecular weight of 9,000 to 25,000;

(4) A composition for a gasket described in any of (1) to (3) wherein the composition has a viscosity of 10,000 to 50,000 centipoises at 25° C.;

(5) A process for producing a gasket comprising discharging a composition which comprises (A) 100 parts by weight of a urethane acrylate oligomer having a weight-average molecular weight of 7,000 to 40,000, (B) 40 to 260 parts by weight of one type of monoacrylate or a mixture of two or more types of monoacrylate selected from the group consisting of monoacrylates represented by the following general formula [1] or [2], and (C) 0.5 to 5 parts by weight of a photopolymerization initiator and has a viscosity of 4,000 to 100,000 centipoises at 25° C. on a substrate by using an X-Y-Z-driving automatic coating robot and curing the discharged composition by irradiation of ultraviolet light:

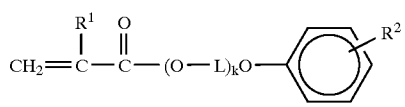

[1]

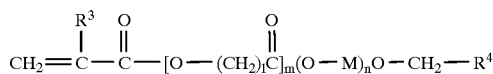

[2]

(wherein $R^1$ and $R^3$ represent each hydrogen or methyl group, $R^2$ represents hydrogen or a hydrocarbon group having 1 to 15 carbon atoms, $R^4$ represents

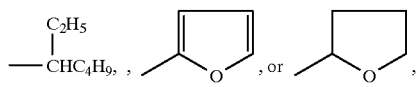

L and M represent each ethylene group or 2-hydroxy-1,3-propylene group, k represents an integer of 1 to 20, 1 represents an integer of 3 to 5, m and n represent each 0 or an integer of 1 to 6, and m and n do not represent 0 simultaneously);

(6) A composition for a gasket described in (5) wherein the urethane acrylate oligomer has a weight-average molecular weight of 9,000 to 25,000;

(7) A composition for a gasket described in any of (5) and (6) wherein the composition has a viscosity of 10,000 to 50,000 centipoises at 25° C.;

(8) A primer composition which is applied to a substrate before a composition for a gasket described in (1) is discharged to the substrate, comprises (D) 100 parts by weight of an epoxyacrylate, (E) 40 to 260 parts by weight of one type of monoacrylate or a mixture of two or more types of monoacrylate selected from the group consisting of monoacrylates represented by the following general formula [1] or [2], and (F) 0.5 to 5 parts by weight of a photopolymerization initiator, and can be cured by an active energy radiation:

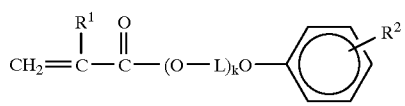

[1]

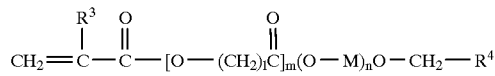

[2]

(wherein $R^1$ and $R^3$ represent each hydrogen or methyl group, $R^2$ represents hydrogen or a hydrocarbon group having 1 to 15 carbon atoms, $R^4$ represents

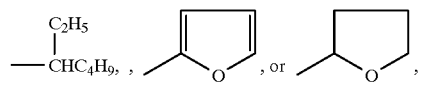

L and M represent each ethylene group or 2-hydroxy-1,3-propylene group, k represents an integer of 1 to 20, 1 represents an integer of 3 to 5, m and n represent each 0 or an integer of 1 to 6, and m and n do not represent 0 simultaneously); and (9) A process for producing a gasket comprising coating a substrate with a primer composition which comprises (D) 100 parts by weight of an epoxyacrylate, (E) 40 to 260 parts by weight of one type of monoacrylate or a mixture of two or more types of monoacrylate selected from the group consisting of monoacrylates represented by the following general formula [1] or [2], and (F) 0.5 to 5 parts by weight of a photopolymerization initiator, then discharging a composition which comprises (A) 100 parts by weight of a urethane acrylate oligomer having a weight-average molecular weight of 7,000 to 40,000, (B) 40 to 260 parts by weight of one type of monoacrylate or a mixture of two or more types of monoacrylate selected from the group consisting of monoacrylates represented by the following general formula [1] or [2], and (C) 0.5 to 5 parts by weight of a photopolymerization initiator and has a viscosity of 4,000 to 100,000 centipoises at 25° C. on the substrate by using an X-Y-Z-driving automatic coating robot, and curing the discharged composition by irradiation of ultraviolet light:

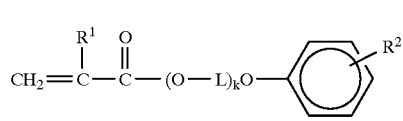

[1]

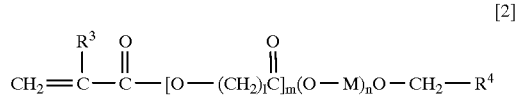

[2]

(wherein $R^1$ and $R^3$ represent each hydrogen or methyl group, $R^2$ represents hydrogen or a hydrocarbon group having 1 to 15 carbon atoms, $R^4$ represents

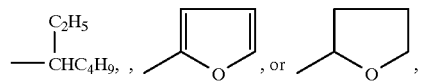

L and M represent each ethylene group or 2-hydroxy-1,3-propylene group, k represents an integer of 1 to 20, 1 represents an integer of 3 to 5, m and n represent each 0 or an integer of 1 to 6, and m and n do not represent 0 simultaneously).

Figure 1:
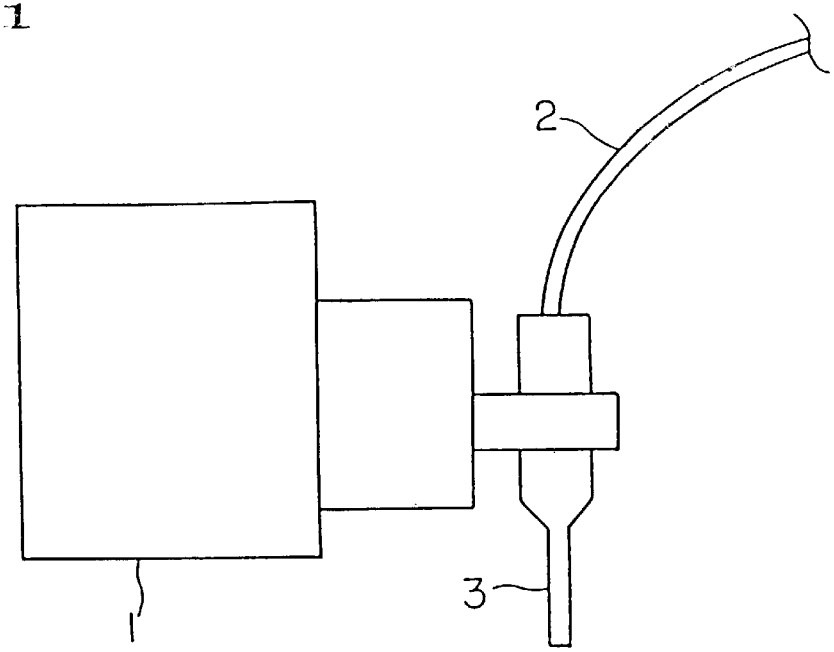
FIG. 1 shows a schematic presentation of an embodiment of the apparatus used in the present invention for discharging and curing a composition curable by ultraviolet light.

The numbers in the figures have the meanings as listed in the following:

1: a control part for an X-Y-Z-driving robot
2: a pipe for supplying a composition curable by ultraviolet light
3: a dispenser
4: a metal plate
5: a gasket

THE MOST PREFERRED EMBODIMENT TO CARRY OUT THE INVENTION

In the composition for a gasket of the present invention, the urethane acrylate oligomer used as component (A) has a weight-average molecular weight of 7,000 to 40,000, preferably 9,000 to 25,000. In the present invention, the molecular weight of the urethane acrylate oligomer is measured by the gel permeation chromatography using polystyrene having a known molecular weight as the reference material. When the weight-average molecular weight of the urethane acrylate oligomer is lower than 7,000, the gasket obtained after forming is hard, and there is the possibility that the sealing property is inferior. When the weight-average molecular weight of the urethane acrylate oligomer is higher than 40,000, the composition curable by ultraviolet light has an excessively high viscosity. Examples of the urethane acrylate oligomer include urethane acrylate oligomers prepared by using polyether polyols, urethane acrylate oligomers prepared by using polyester polyols, urethane acrylate oligomers having both ether group and ester group in the molecule, and urethane acrylate oligomers prepared by using carbonate diols having carbonate group. Examples of the polyether polyol include polyethylene glycol, polypropylene glycol, polytetramethylene glycol, polyhexamethylene glycol, and compounds obtained by addition of ethylene oxide or propylene oxide to 1,3-butylene glycol, 1,4-butylene glycol, 1,6-butylene glycol, neopentyl glycol, cyclohexanedimethanol, 2,2-bis(4-hydroxycyclohexyl) propane, or bisphenol A. The polyester polyol can be obtained by the reaction of an alcohol component and an acid component. Examples of the alcohol component include polyethylene glycol, polypropylene glycol, polytetramethylene glycol, compounds obtained by addition of ethylene oxide, propylene oxide, or e-caprolactone to 1,3-butylene glycol, 1,4-butylene glycol, 1,6-butylene glycol, neopentyl glycol, 1,4-cyclohexanedimethanol, 2,2-bis(4-hydroxycyclohexyl)propane, or bisphenol A. Examples of the acid component include dibasic acids, such as adipic acid, sebacic acid, azelaic acid, and dodecanedicarboxylic acid, and anhydrides of these acids. Compounds obtained by simultaneously bringing the above alcohol component, the above acid component, and ε-caprolactone into the reaction to each other can also be used as the polyester polyol.

The carbonate diol can be obtained, for example, by the transesterification of a diaryl carbonate or an alkyl carbonate, such as diphenyl carbonate, bis-chlorophenyl carbonate, dinaphthyl carbonate, phenyl toluyl carbonate, phenyl chlorophenyl carbonate, 2-tolyl 4-tolyl carbonate, dimethyl carbonate, and diethyl carbonate, with a diol, such as 1,6-hexanediol, neopentyl glycol, 1,4-butanediol, 1,8-octanediol, 1,4-cyclohexanedimethanol, 2-methylpropanediol, dipropylene glycol, dibutylene glycol, a reaction product of the above diol compound and a dicarboxylic acid, such as oxalic acid, malonic acid, succinic acid, adipic acid, azelaic acid, and hexahydrophthalic acid, or a polyester diol which is the reaction product of the above diol compound and ε-caprolactone. The polycarbonate diol thus obtained is a monocarbonate diol having one carbonate structure in the molecule or a polyearbonate diol having two or more carbonate structures in the molecule.

In order to obtain the urethane acrylate oligomer of component (A) of the present invention by using such a polyether polyol, a polyester polyol, or a carbonate diol, an organic diisocyanate compound and a polymerizable monomer having hydroxyl group are brought into reaction with the hydroxyl group of the polyol. Examples of the organic diisocyanate compound include aromatic diisocyanates, such as tolylene diisocyanate and 4,4'-diphenylmethane diisocyanate, alicyclic diisocyanates, such as isophorone diisocyanate and 4,4'-dicyclohexylmethane diisocyanate, and aliphatic diisocyanates, such as tetramethylene diisocyanate, hexamethylene diisocyanate, and trimethylhexamethylene diisocyanate. Examples of the polymerizable monomer having hydroxyl group include acrylates having hydroxyl group, such as β-hydroxyethyl acrylate, β-hydroxypropyl acrylate, β-hydroxylauryl acrylate, and adducts of ε-caprolactone and β-hydroxyethyl acrylate. In the reaction of isocyanate group and hydroxyl group, a conventional catalyst, for example, a tertiary amine such as triethylamine, an organometallic compound such as dibutyltin dilaurate, or a tin chloride, may be used.

In the composition for a gasket of the present invention, particularly preferable examples of the urethane acrylate oligomer as component (A) include urethane acrylate oligomers prepared by using polyether polyols or polyester polyols. As the organic diisocyanate, isophorone diisocyanate, 4,4'-dicyclohexylmethane diisocyanate, and hexamethylene diisocyanate are particularly preferable.

The monoacrylate represented by general formula [1] which is used in the composition for a gasket of the present invention can be obtained by adding an alkylene oxide to a phenol, such as phenol or an alkylphenol, followed by esterification of the addition product with acrylic acid or methacrylic acid. Specific examples of the phenol include phenol and phenols to which alkyl groups having 1 to 15 carbon atoms are bonded. Specific examples of the alkylene oxide include ethylene oxide and propylene oxide. For preparation of the monoacrylate represented by general formula [1], a conventional process can be used. For example, the monoacrylate can be prepared as follows: an alkylene oxide is added to a phenol in the presence of an alkali catalyst; to the obtained addition product of alkylene oxide, a slightly excess amount of acrylic acid or methacrylic acid is added; the obtained mixture is heated in the presence of an esterification catalyst such as p-toluenesulfonic acid, a polymerization inhibitor such as hydroquinone monomethyl ether, and a solvent which makes an azeotrope with water such as toluene; the esterification reaction is allowed to proceed while formed water is removed by azeotropic distillation; the solvent is removed after the reaction is finished; and the residual acrylic acid or methacrylic acid is removed by washing the obtained reaction product to obtain a monoacrylate. The monoacrylate thus obtained generally has a molecular weight of 200 to 1,500 and a viscosity of 10 to 200 centipoises at 25° C.

The monoacrylate represented by general formula [2] which is used in the composition for a gasket of the present invention can be obtained by addition of 1 mol or more of ethylene oxide, propylene oxide, γ-butyrolactone, or ε-caprolactone to 2-ethylhexyl alcohol, furfuryl alcohol, or tetrahydrofurfuryl alcohol to obtain a monohydroxy compound, followed by esterification of the obtained monohydroxy compound with acrylic acid or methacrylic acid. For preparation of the monoacrylate represented by general formula [2], a conventional process can be used. For example, the monoacrylate can be prepared as follows: an alkylene oxide is added to 2-ethylhexyl alcohol, furfuryl alcohol, or tetrahydrofurfuryl alcohol in the presence of an alkali catalyst; to the obtained addition product of alkylene oxide, γ-butyrolactone or ε-caprolactone is added in the presence of a catalyst such as tetrabutyl titanate to obtain a monohydroxy compound; a slightly excess amount of acrylic acid or methacrylic acid is added to the obtained monohydroxy compound; the mixture is heated in the presence of an esterification catalyst such as p-toluenesulfonic acid, a polymerization inhibitor such as hydroquinone monomethyl ether, and a solvent which makes an azeotrope with water such as toluene; the esterification reaction is allowed to proceed while formed water is removed by azeotropic distillation; the solvent is removed after the reaction is finished; and the residual acrylic acid or methacrylic acid is removed by washing the obtained reaction product to obtain a monoacrylate. The monoacrylate thus obtained generally has a molecular weight of 160 to 1,200 and a viscosity of 3 to 500 centipoises at 25° C.

The monoacrylates represented by general formulae [1] and [2] used as component (B) in the composition for a gasket of the present invention both have a long side chain. When the monoacrylate is polymerized in combination with the urethane acrylate oligomer of component (A), the side chain exhibits the internal plasticizing effect in the resultant polymer, and a formed product which is excellent in the flexibility and the tensile strength and shows a small compression set can be provided by this effect in combination with the effect of the presence of the oligomer.

The amount of component (B) is 40 to 260 parts by weight, preferably 80 to 160 parts by weight, per 100 parts by weight of the urethane acrylate oligomer of component (A). When the amount is less than 40 parts by weight, the composition for a gasket has a high viscosity, and coating the substrate with the composition becomes difficult. When the amount is more than 260 parts by weight, the viscosity of the composition is low, and the tendency towards sagging is caused. Moreover, the formed gasket is inferior in the elasticity to cause the tendency towards insufficient sealing.

In the composition for a gasket of the present invention, a photopolymerization initiator can be used as component (C). The photopolymerization initiator used as component (C) is not particularly limited, and a conventional photopolymerization initiator can be used. A photopolymerization initiator having a good storage stability after the preparation of the compound is preferable. Examples of the photopolymerization initiator include benzoin alkyl ether photopolymerization initiators, such as benzoin ethyl ether, benzoin isobutyl ether, and benzoin isopropyl ether; acetophenone photopolymerization initiators, such as 2,2-diethoxyacetophenone and 4'-phenoxy-2,2-dichloroacetophenone; propiophenone photopolymerization initiators, such as 2-hydroxy-2-methylpropiophenone, 4'-isopropyl-2-hydroxy-2-methylpropiophenone, and 4'-dodecyl-2-hydroxy-2-methylpropiophenone; benzyl dimethyl ketal; 1-hydroxycyclohexyl phenyl ketone; anthraquinone photopolymerization initiators, such as 2-ethylanthraquinone and 2-chloroanthraquinone; and thioxanthone photopolymerization initiators. A single type of the photopolymerization initiator can be used, and a mixture of two or more types of the photopolymerization initiator in a desired ratio can also be used.

In the composition for a gasket of the present invention, when the photopolymerization initiator of component (C) is used, the used amount is 0.5 to 5 parts by weight, preferably 1 to 3 parts by weight, per 100 parts by weight of the urethane acrylate oligomer of component (A). When the amount of the photopolymerization initiator is less than 0.5 parts by weight per 100 parts by weight of the urethane acrylate oligomer, there is the possibility that the time of polymerization is increased or that the polymerization cannot be completed. When the amount of the photopolymerization initiator is more than 5 parts by weight per 100 parts by weight of the urethane acrylate oligomer, the photopolymerization initiator remains mixed in the obtained cured formed product, and there is the possibility that the physical properties become inferior.

In the composition for a gasket of the present invention, a photosensitizer may additionally be used. Examples of the photosensitizer include amines, such as aliphatic amines and aromatic amines; ureas, such as o-tolylthiourea; sulfur compounds, such as sodium diethyldithiophosphate and s-benzylisothiuronium p-toluenesulfonate; nitrites such as N,N-disubstituted p-aminobenzonitrile compounds; phosphorus compounds, such as tri-n-butylphosphine; N-nitrosohydroxylamine derivatives; and other compounds containing nitrogen.

The composition for a gasket of the present invention may also comprise inhibitors for thermal polymerization, such as hydroquinone and 2,6-di-tert-butyl-4-methylphenol; cure accelerators, such as cobalt naphthenate and dimethylaniline; pigments; and other additives, where necessary.

The composition for a gasket of the present invention can be obtained by homogeneously mixing specific amounts of component (A), component (B) and optionally, component (C). The operation of the mixing is preferably conducted in a clean room in order to prevent contamination with dusts.

The viscosity of the composition for a gasket of the present invention is in the range of 4,000 to 100,000 centipoises, preferably in the range of 10,000 to 50,000 centipoises, at 25° C. When the viscosity is less than 4,000 centipoises at 25° C., the composition has a large fluidity, and the composition formed to a shape of a gasket tends to be deformed before the irradiation of ultraviolet light. When the viscosity is more than 100,000 centipoises, forming the composition to a shape of a gasket is difficult.

For preparation of a gasket for sealing a casing of a high precision instrument, such as a gasket for sealing the gap between a dust cover and a container encasing a magnetic disk in a magnetic hard disk drive unit (HDD), the composition for a gasket of the present invention is formed to a required shape, such as a shape of a thread or a sheet. After the composition for a gasket of the present invention is formed to the shape of a gasket, the composition is cured by irradiation of an active energy radiation. In the present invention, when ultraviolet light is used as the active energy radiation, a photopolymerization initiator and/or a photosensitizer is preferably comprised in the composition.

The active energy radiation used for curing the composition for a gasket of the present invention means ultraviolet light or an ionizing radiation, such as electron beam, α-ray, β-ray, and γ-ray. When ultraviolet light is used as the active energy radiation, the composition preferably comprises a photopolymerization initiator and/or a photosensitizer. When an ionizing radiation such as electron beam and γ-ray is used, the curing can be achieved rapidly without using a photopolymerization initiator or a photosensitizer.

In the present invention, examples of the source of ultraviolet light include a xenon lamp, a low voltage mercury lamp, a high voltage mercury lamp, or a ultra-high voltage mercury lamp. As the atmosphere of the irradiation of ultraviolet light, an atmosphere of an inert gas, such as nitrogen gas and carbon dioxide gas, or an atmosphere having a decreased oxygen concentration is preferable. However, the composition curable by ultraviolet light can also be cured in an ordinary atmosphere of the air. As for the temperature of the atmosphere of the irradiation, an ambient temperature may be used, or the atmosphere may be heated to utilized the heat for the curing reaction. The composition is generally cured at a temperature in the range of 10 to 200° C.

In the process for producing a gasket of the present invention, a composition curable by ultraviolet light which comprises (A) 100 parts by weight of a urethane acrylate oligomer, (B) 40 to 260 parts by weight of a monoacrylate represented by general formula [1] or [2], and (C) 0.5 to 5 parts by weight of a photopolymerization initiator is used. The composition curable by ultraviolet light is discharged to specified parts of a substrate, such as a metal plate, to which the gasket is attached through a dispenser by using a X-Y-Z-driving automatic coating robot, and the discharged composition is cured by irradiation of ultraviolet light.

As an example of the present invention, FIG. 1 shows a schematic representation of an embodiment of the apparatus for discharging and curing the composition curable by ultraviolet light which is used for producing a gasket for sealing a gap between a dust cover and a container encasing a magnetic disk of HDD. The apparatus is equipped with a control part for an X-Y-Z-driving robot 1, a pipe for supplying a composition curable by ultraviolet light 2, a dispenser 3, and an apparatus for irradiation of ultraviolet light. The dispenser is controlled by the X-Y-Z-driving robot. The dispenser transfers the composition curable by ultraviolet light from a storage tank to a metal plate, i.e., a substrate to which the gasket is attached, and discharges the composition in a specified shape. The apparatus for irradiation of ultraviolet light irradiates ultraviolet light to the composition curable by ultraviolet light which has been discharged from the dispenser, and the composition is quickly cured.

In the process of the present invention, the composition for a gasket is discharged from the dispenser directly to a substrate which is made of a plate of a metal, such as stainless steel, nickel-plated steel, or anodized aluminum, or a plate of a synthetic resin, such as epoxy resin, ABS resin, acrylic resin, or polycarbonate, and cured. Therefore, in comparison with conventional processes in which a gasket material is formed into a sheet and a gasket of a ring shape is punched out from the sheet, the process of the present invention has advantages in that a gasket can be produced by using a far smaller amount of the material because no part for disposal is formed and that no operations for working and attaching the gasket are required at all. The process of the present invention is superior also to processes in which chloroprene rubber or butyl rubber is molded together with a metal substrate in that the operations of molding the material, removing burrs, and attaching the gasket are not necessary.

The gasket is generally formed to a shape having a width of the part in contact with the substrate of 1 to 3 mm and a height from the surface of the substrate of about 0.5 to 1.5 mm. The section of the gasket has a shape of an approximate half circle.

It is preferred that, before the composition for a gasket of the present invention is applied to a substrate, the parts to which the above composition for a gasket is to be applied is coated in advance with a primer which is a composition comprising (D) 100 parts by weight of an epoxyacrylate, (E) 40 to 260 parts by weight of one type of monoacrylate or a mixture of two or more types of monoacrylate selected from the group consisting of monoacrylates represented by general formula [1] or [2], and (F) 0.5 to 5 parts by weight of a photopolymerization initiator and the primer is cured by irradiation of the same active energy radiation as that used for curing the composition for a gasket.

By coating the thus formed layer of a primer with the composition for a gasket of the present invention, the gasket can be adhered more tightly to the substrate.

As the epoxyacrylate used as component (D) in the primer composition, an epoxyacrylate which is a reaction product of an epoxy resin of the bisphenol A type and acrylic acid or an epoxyacrylate which is a reaction product of an epoxy resin of the bisphenol F type and acrylic acid can preferably used.

The monoacrylate used as component (E) in the primer composition is the same as the monoacrylate used as component (B) in the composition for a gasket. Any of the monoacrylates used as component (B) in the composition for a gasket can be used. The amount of component (E) in the primer composition is 40 to 260 parts by weight, preferably 100 to 180 parts by weight, per 100 parts by weight of the epoxyacrylate of component (D). When the amount is less than 40 parts by weight, the viscosity of the primer composition becomes high to cause difficulty in the coating. When the amount is more than 260 parts by weight, the viscosity is excessively low, and moreover the adhesion to the substrate is decreased.

The photopolymerization initiator used as component (F) in the primer composition is the same as the photopolymerization initiator used as component (C) in the composition for a gasket. The amount of component (F) in the primer composition is 0.5 to 5 parts by weight, preferably 1 to 3 parts by weight, per 100 parts by weight of the epoxyacrylate of component (D). When the amount is less than 0.5 parts by weight, there is the possibility that the time of polymerization is increased or that the reaction is not completed. When the amount is more than 5 parts by weight, there is the possibility that the residual photopolymerization initiator and products formed by decomposition of the photopolymerization initiator remain mixed in the obtained composition to cause contamination by vaporization and softening of the cured primer.

The primer composition is applied in advance, i.e., before the composition for a gasket of the present invention is applied, to the parts to which the composition for a gasket is to be applied. In other words, the primer composition is applied along the locus of the movement of the dispenser by the X-Y-Z-driving robot. Then, the applied primer composition is cured by irradiation of an energy radiation. As for the amount of the application of the primer, the width is preferably 0.3 to 2 mm, more preferably 0.5 to 1 mm, and the height is preferably 0.05 to 1 mm, more preferably 0.2 to 0.5 mm. The condition of irradiation of the primer composition by an energy radiation is the same as that of the composition for a gasket.

By applying the composition for a gasket of the present invention on the layer of the primer which coats the part of the substrate and has been cured, the gasket obtained by forming and curing the composition for a gasket by irradiation of the energy radiation can be adhered far more tightly to the substrate. In the above structure, a sufficient effect of enhancing the adhesion is exhibited when the width of the primer is one half or more of the width of the gasket even when the gasket attached on top of the primer has a larger width than the width of the primer.

The composition for a gasket comprising the urethane acrylate oligomer, the monoacrylate, and the photopolymerization initiator and the primer composition comprising the epoxyacrylate, the monoacrylate, and the photopolymerization initiator which are used in the process of the present invention do not contain any volatile low molecular weight substances after the compositions have been cured by ultraviolet light. Therefore, there is no possibility that the inside of a high precision instrument such as a magnetic hard disk drive unit is contaminated with volatile matters to cause error in recording and reading information by a magnetic head.

The present invention is described in more detail in the following with reference to examples. However, the present invention is not limited by the examples.

The Test Methods

1) Hardness

By using a test piece of a gasket (100×100×2 mm), the hardness was obtained in accordance with the method of Japanese Industrial Standard K 6301.

2) Tensile properties

By using a test piece of a gasket (100×100×2 mm), the tensile strength and the elongation were obtained in accordance with the method of Japanese Industrial Standard K 6301.

EXAMPLES 1 TO 4 AND COMPARATIVE EXAMPLES 1 to 4

Components of the types and the amounts both shown in Table 1 were taken into a vessel and mixed together. The viscosity of the mixture was measured by a Brookfield viscometer. Then the mixture was extended on a plate of quartz glass. A spacer of 2 mm was placed on the plate of quartz glass, and another plate of quartz glass was placed on the spacer. The obtained combination was irradiated by ultraviolet light of 1,200 mJ/cm$^2$ to obtain a cured sheet. The hardness and the tensile properties of the cured sheet were measured. The results are shown in Table 1.

Notes to Table 1

(a) A urethane acrylate oligomer prepared from a polyester diol which was prepared by condensation of neopentyl glycol, ethylene glycol, and butanediol with adipic acid, hexamethylene diisocyanate, and 2-hydroxyethyl acrylate; weight-average molecular weight: 24,000.

(b) KAYARAD UX-3204; a product of NIPPON KAYAKU Co., Ltd.; a urethane acrylate oligomer; weight-average molecular weight: 9,200.

(c) KAYARAD UX-3301; a product of NIPPON KAYAKU Co., Ltd.; a urethane acrylate oligomer; weight-average molecular weight: 6,200.

(d) A urethane acrylate oligomer prepared from a polyester diol which was prepared by condensation of neopentyl glycol with adipic acid, polytetramethylene glycol, isophorone diisocyanate, and 2-hydroxyethyl acrylate; weight-average molecular weight: 45,000.

(e) KAYARAD R128H; a product of NIPPON KAYAKU Co., Ltd.; a monoacrylate having the following formula:

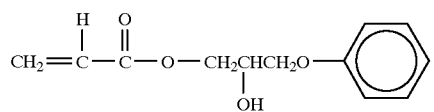

(f) KAYARAD TC-110S; a product of NIPPON KAYAKU CO., Ltd.; a monoacrylate having the following formula:

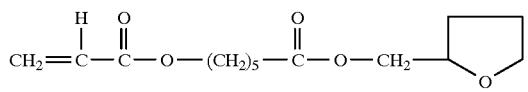

(g) ARONIX M-111, a product of TOA GOSEI Co., Ltd.; a monoacrylate having the following formula:

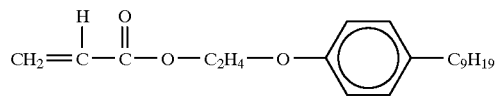

(h) ARONIX M-150; a product of TOA GOSEI Co., Ltd.; a monomer having the following formula:

TABLE 1

|  |  | Example | | | | Comparative Example | | | |
| --- | --- | --- | --- | --- | --- | --- | --- | --- | --- |
|  |  | 1 | 2 | 3 | 4 | 1 | 2 | 3 | 4 |
| formation of composition for a gasket (part by wt.) | | | | | | | | | |
| (A) | (a) | 100 | — | 100 | 100 | — | — | 100 | 100 |
|  | (b) | — | 100 | — | — | — | — | — | — |
|  | (c) | — | — | — | — | 100 | — | — | — |
|  | (d) | — | — | — | — | — | 100 | — | — |
| (B) | (e) | 230 | 100 | — | — | 230 | 230 | — | — |
|  | (f) | — | — | 100 | — | — | — | — | — |
|  | (g) | — | — | — | 100 | — | — | — | — |
|  | (h) | — | — | — | — | — | — | 100 | — |
|  | (i) | — | — | — | — | — | — | — | 100 |
| (C) | (j) | 3 | 3 | 3 | 3 | 3 | 3 | 3 | 3 |
| viscosity (centipoise) | | 4,500 | 70,000 | 80,000 | 95,000 | 3,800 | >100,000 | 4,000 | — |
| hardness | | 44 | 40 | 30 | 42 | 65 | — | >95 | — |
| tensile strength (kg/cm$^2$) | | 68 | 45 | 55 | 60 | 130 | — | — | — |
| elongation (%) | | 140 | 150 | 100 | 140 | 160 | — | — | — |

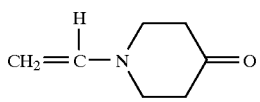

(i) ARONIX M-117; a product of TOA GOSEI Co., Ltd.; a monoacrylate having the following formula:

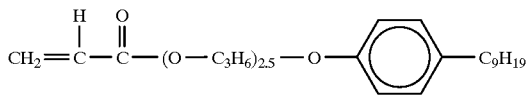

(j) IRGACURE 184; a product of CIBA GEIGY Company; a photopolymerization initiator having the following formula:

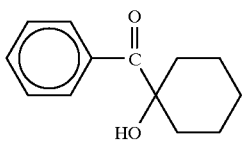

The compositions which were prepared by using components (A) and (B) satisfying the requirements of the present invention and a photopolymerization initiator all had a viscosity in the range of 4,000 to 100,000 centipoises at 25° C., were easily formed to a shape, and provided cured products which were flexible and had excellent tensile strength and elongation by irradiation of ultraviolet light (Examples i to 4).

The composition prepared by using component (A) having a molecular weight lower than the specified range had a small viscosity to cause a great possibility that the shape was deformed, and the product obtained from the composition by curing by ultraviolet light had an excessively high hardness to cause a problem as a gasket in the sealing property (Comparative Example 1). The composition prepared by using component (A) having a molecular weight higher than the specified range had an excessively high viscosity and could not be formed to a shape of a gasket (Comparative Example 2). When component (B) which did not have the specified structure was used, the hardness of the obtained cured product was excessively high (Comparative Example 3), or the composition which showed phase separation and from which uniform forming could not be expected was obtained (Comparative Example 4).

EXAMPLE 5

Figure 2:
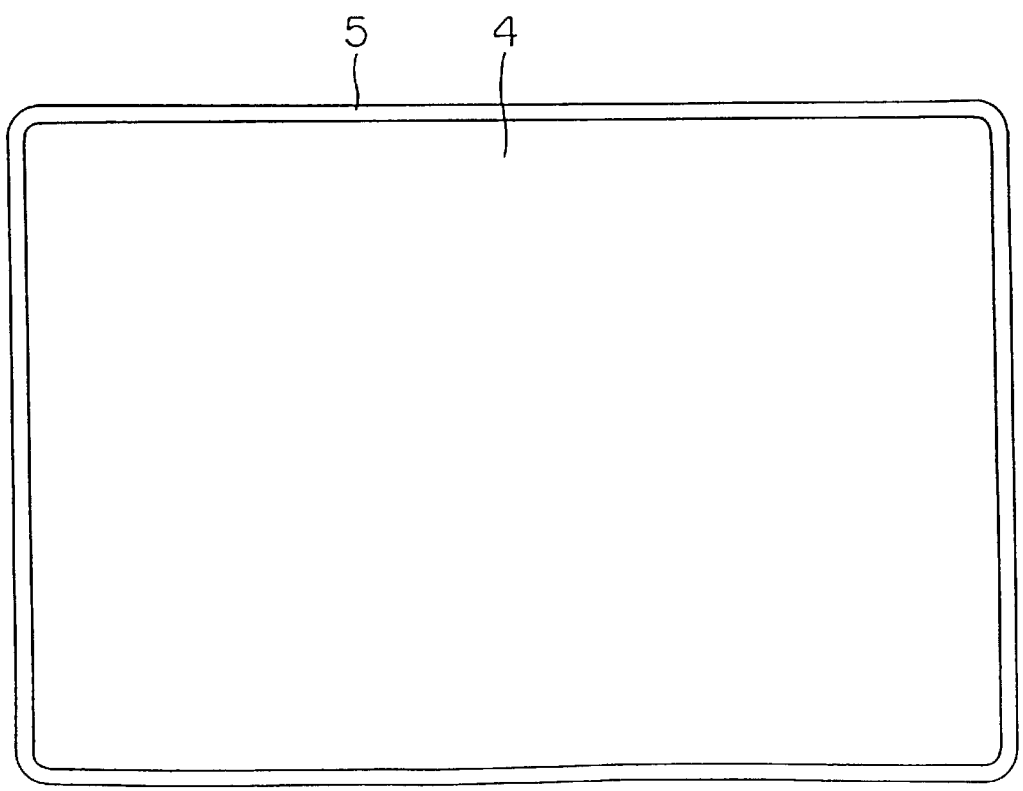
FIG. 2 shows a plan view of a dust cover which is prepared in Example 5.

A metal plate having a length of 102 mm and a width of 146 mm which was to be used as a dust cover of a magnetic hard disk drive unit was degreased. Then, the composition curable by ultraviolet light which had been prepared in Example 1 was discharged from a dispenser by using a coating robot on the degreased metal plate to the shape of a gasket which was to be formed. The composition discharged from the dispenser was irradiated by ultraviolet light of 1,000 mJ/cm$^2$ by using an apparatus for irradiation of ultraviolet light. FIG. 2 shows a plan view of the dust cover which was prepared in this example. In FIG. 2, a gasket 5 having a width of the part in contact with the metal plate of 2.0 mm and a height from the metal plate of 1.0 mm was formed in the peripheral parts of the metal plate 4.

The discharged composition curable by ultraviolet light was cured by ultraviolet light. The section of the cured composition had a shape of an approximate half circle.

In accordance with the present invention, the gasket was simultaneously formed and set at the specified parts. Thus, the gasket could be prepared conveniently and efficiently.

EXAMPLE 6

On a stainless steel plate (SUS 304) which had been degreased, a gasket having a width of 2.0 mm and a height of 1.0 mm was formed by using the composition for a gasket prepared in Example 3 in accordance with the same procedures as those conducted in Example 5 (Sample A). Separately, on two stainless steel plates which had been degreased, a primer composition comprising 100 parts by weight of an epoxyacrylate (weight-average molecular weight, 1,100) which was obtained by the reaction of an epoxy resin of the bisphenol A type (a product of YUKA SHELL EPOXY Co., Ltd.; EPIKOTE 1001) with acrylic acid, 150 parts by weight of a monoacrylate (KAYARAD R128H; described above), and 2.5 parts by weight of a photopolymerization initiator (IRGACURE 184; described above) was applied by drawing a line with the primer composition along the locus for the gasket to form a line of a shape having a width of 0.5 mm and a height of 0.2 mm and cured by irradiation of ultraviolet light of 1,000 mJ/cm$^2$ (Samples B and C). On the cured primer of Sample B thus prepared, a gasket having a width of 2.0 mm and a height of 1.0 mm was formed by using the composition for a gasket prepared in Example 3 in accordance with the same procedures as those conducted in Example 5 (Sample D). To examine the adhesion of the gasket to the stainless steel plate in Sample A, the gasket was pushed strongly by a forefinger to the direction perpendicular to the line of the gasket. The gasket was peeled and pushed aside. The adhesion of the cured primer in Sample C was examined in the same manner. The primer was tightly adhered and did not move. When the gasket in Sample D was attempted to peel by pulling with fingers, the primer was not peeled from the stainless steel plate, and tearing was formed in the gasket on the primer.

The adhesive strength of the compositions used in Samples A and C were examined by the following method. Two stainless steel plates (SUS 304) having a long rectangular shape of a width of 5 mm, a length of 100 mm, and a thickness of 1.25 mm were used. The two plates were put together in such a manner that the end parts of the plates to the direction of the length were overlapped by 30 mm. The compositions used in Samples A and C before curing were used separately as the adhesive. The plates were put together by coating the part for adhesion of one of the steel plates with the composition to the thickness of 1 mm, followed by laminating the two steel plates together. The adhesive layer was irradiated by ultraviolet light of 1,000 mJ/cm$^2$ in such a manner that the side of the adhesive layer of the length of 30 mm was directly irradiated by the light from the direction of the side. Three samples were prepared by using each of Samples A and C in accordance with the above procedures. The shearing adhesive strength was measured by pulling the longitudinal ends of the combined plates at a speed of 50 mm/min by using a tensile tester (a product of SHIMADZU SEISAKUSHO Co., Ltd.; AGS-500). The average shearing adhesive strength of the composition of Sample A was 2.5 kgf/cm$^2$, and the average shearing adhesive strength of the composition of Sample C was 51 kgf/cm$^2$.

INDUSTRIAL APPLICABILITY

In accordance with the present invention, a gasket which is flexible, has a large tensile strength and elongation, and shows a small compression set and a small decrease in weight by heating can be obtained conveniently and efficiently.

We claim:

1. A composition for a gasket which comprises (A) 100 parts by weight of a urethane acrylate oligomer having a weight-average molecular weight of 7,000 to 40,000, (B) 40 to 260 parts by weight of a monoacrylate having the following formula:

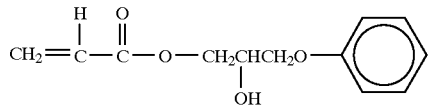

and (C) 0.5 to 5 parts by weight of a photopolymerization initiator, has a viscosity of 4,000 to 100,000 centipoises at 25° C., and can be cured by an active energy radiation.

2. A composition for a gasket according to claim 1 wherein the active energy radiation is ultraviolet light.

3. A composition for a gasket according to claim 2 wherein the urethane acrylate oligomer has a weight-average molecular weight of 9,000 to 25,000.

4. A composition for a gasket according to claim 3 wherein the composition has a viscosity of 10,000 to 50,000 centipoises at 25° C.

5. A composition for a gasket according to claim 2 wherein the composition has a viscosity of 10,000 to 50,000 centipoises at 25° C.

6. A composition for a gasket according to claim 1 wherein the urethane acrylate oligomer has a weight-average molecular weight of 9,000 to 25,000.

7. A composition for a gasket according to claim 6 wherein the composition has a viscosity of 10,000 to 50,000 centipoises at 25° C.

8. A composition for a gasket according to claim 1 wherein the composition has a viscosity of 10,000 to 50,000 centipoises at 25° C.

9. A primer composition which is applied to a substrate before a composition for a gasket described in claim 1 is discharged to the substrate, comprises (D) 100 parts by weight of an epoxyacrylate, (E) 40 to 260 parts by weight of a monoacrylate having the following formula:

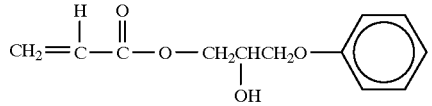

and (F) 0.5 to 5 parts by weight of a photopolymerization initiator, and can be cured by an active energy radiation.

10. A process for producing a gasket comprising discharging a composition which comprises (A) 100 parts by weight of a urethane acrylate oligomer having a weight-average molecular weight of 7,000 to 40,000, (B) 40 to 260 parts by weight of a monoacrylate having the following formula:

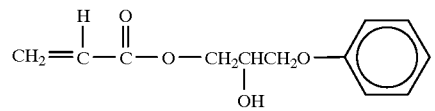

and (C) 0.5 to 5 parts by weight of a photopolymerization initiator and has a viscosity of 4,000 to 100,000 centipoises at 25° C. on a substrate by using an X-Y-Z-driving automatic coating robot and curing the discharged composition by irradiation of ultraviolet light.

11. A process for producing a gasket according to claim 10 wherein the urethane acrylate oligomer has a weight-average molecular weight of 9,000 to 25,000.

12. A process for producing a gasket according to claim 11 wherein the composition has a viscosity of 10,000 to 50,000 centipoises at 25° C.

13. A process for producing a gasket according to claim 10 wherein the composition has a viscosity of 10,000 to 50,000 centipoises at 25° C.

14. A process for producing a gasket comprising coating a substrate with a primer composition which comprises (D) 100 parts by weight of an epoxyacrylate, (E) 40 to 260 parts by weight of a monoacrylate having the following formula:

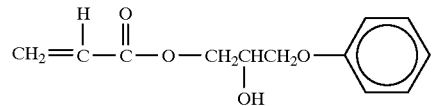

and (F) 0.5 to 5 parts by weight of a photopolymerization initiator, then discharging a composition which comprises (A) 100 parts by weight of a urethane acrylate oligomer having a weight-average molecular weight of 7,000 to 40,000, (B) 40 to 260 parts by weight of one type of monoacrylate or a mixture of two or more types of monoacrylate selected from the group consisting of monoacrylates represented by the following general formula or, and (C) 0.5 to 5 parts by weight of a photopolymerization initiator and has a viscosity of 4,000 to 100,000 centipoises at 25° C. on the substrate by using an X-Y-Z driving automatic coating robot, and curing the discharged composition by irradiation of ultraviolet light.

* * * * *